United States Patent
Tang

(10) Patent No.: US 11,983,068 B1
(45) Date of Patent: May 14, 2024

(54) MEMORY DEVICE AND CONTROL METHOD FOR MEMORY DEVICE

(71) Applicant: Vanguard International Semiconductor Corporation, Hsinchu (TW)

(72) Inventor: Po-Yuan Tang, Hsinchu (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/185,855

(22) Filed: Mar. 17, 2023

(51) Int. Cl.
*G11C 29/00* (2006.01)
*G06F 11/10* (2006.01)

(52) U.S. Cl.
CPC ...... *G06F 11/1068* (2013.01); *G06F 2201/82* (2013.01)

(58) Field of Classification Search
CPC .......................... G06F 11/1068; G06F 2201/82
See application file for complete search history.

(56) References Cited

U.S. PATENT DOCUMENTS

| | | | | |
|---|---|---|---|---|
| 2014/0351629 | A1* | 11/2014 | Ware | G06F 11/1068 714/6.13 |
| 2019/0250985 | A1* | 8/2019 | Seo | G06F 11/1068 |
| 2021/0026732 | A1* | 1/2021 | Park | G11C 29/4401 |

* cited by examiner

*Primary Examiner* — Christine T. Tu
(74) *Attorney, Agent, or Firm* — Birch, Stewart, Kolasch & Birch, LLP

(57) ABSTRACT

A memory device and a control method for the memory device are provided. When it is determined that a bit read from a memory cell in a memory cell array is an erroneous bit, the memory device triggers a second reading cycle. During the second reading cycle, if the bit read from the same memory cell is still an erroneous bit, the memory cell is deemed to be a real defective memory cell. At this time, a repairing memory cell is selected from a repairing memory cell array to replace the real defective memory cell. The selected repairing memory cell and the real defective memory cell are coupled to the same word line.

18 Claims, 7 Drawing Sheets

MEMORY DEVICE AND CONTROL METHOD FOR MEMORY DEVICE

BACKGROUND OF THE INVENTION

Field of the Invention

The present invention relates to a memory device, and more particularly to a memory device with a self-repair capability.

Description of the Related Art

An error correction code (ECC) algorithm is generally used in a memory device to detect whether the data stored in the memory array is erroneous, as well as to repair the erroneous bit. In current memory designs, the ECC algorithm is capable of detecting and repairing only one-bit errors. After a one-bit error in the data stored in the memory device has been detected and repaired, if any more one-bit errors occur in the stored data, the ECC algorithm cannot handle two or more one-bit errors, which causes the memory device to produce erroneous read results.

BRIEF SUMMARY OF THE INVENTION

The present invention provides a memory device and a control method for the memory device, which can detect and repair a plurality of erroneous bits.

An embodiment of the invention provides a memory device. The memory device comprises a plurality of word lines, a plurality of bit lines, a plurality of memory cells, a plurality of repairing memory cells, a controller, and a readout and detection circuit. The plurality of memory cells are arranged in a memory cell array. Each of the plurality of memory cells is coupled to one of the plurality of word lines and one of the plurality of bit lines. Each of the plurality of repairing memory cells is coupled to one of the plurality of word lines and one of the plurality of bit lines. The controller operates to enable a first reading cycle. The readout and detection circuit operates to read first readout data from the memory cell array during the first reading cycle and detect that the first bit in the first readout data is an erroneous bit. The controller enables a second reading cycle in response to the detected first bit. The readout and detection circuit reads second readout data from the memory cell array during the second reading cycle and detects that a second bit in the second readout data is an erroneous bit. The controller determines whether both the first bit and the second bit correspond to a first memory cell of the plurality of memory cells. In response to the controller determining that both the first bit and the second bit correspond to the first memory cell, the controller triggers a first writing cycle to write first correct bit data to a first repairing memory cell of the plurality of repairing memory cells. The first repairing memory cell and the first memory cell correspond to the same word line.

An embodiment of the present invention provides a control method for a memory device. The memory device comprises a plurality of word lines, a plurality of bit lines, a plurality of memory cells arranged in a memory cell array, and a plurality of repairing memory cells. According to the control method, a first reading cycle of the memory device is triggered to read first readout data from the memory cell array, and a determination is made as to whether there is an erroneous bit in the first readout data. In response to determining that a first bit in the first readout data is an erroneous bit, a second reading cycle is triggered. During the second reading cycle, second readout data is read from the memory cell array. A determination is made as to whether there is an erroneous bit in the second readout data. In response to determining that a second bit in the second readout data is an erroneous bit, a determination is made as to whether both the first bit and the second bit correspond to a first memory cell of the plurality of memory cells. In response to determining that both the first bit and the second bit correspond to the first memory cell, a first writing cycle triggered to write first correct bit data to a first repairing memory cell of the plurality of repairing memory cells. The first repairing memory cell and the first memory cell correspond to the same word line.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
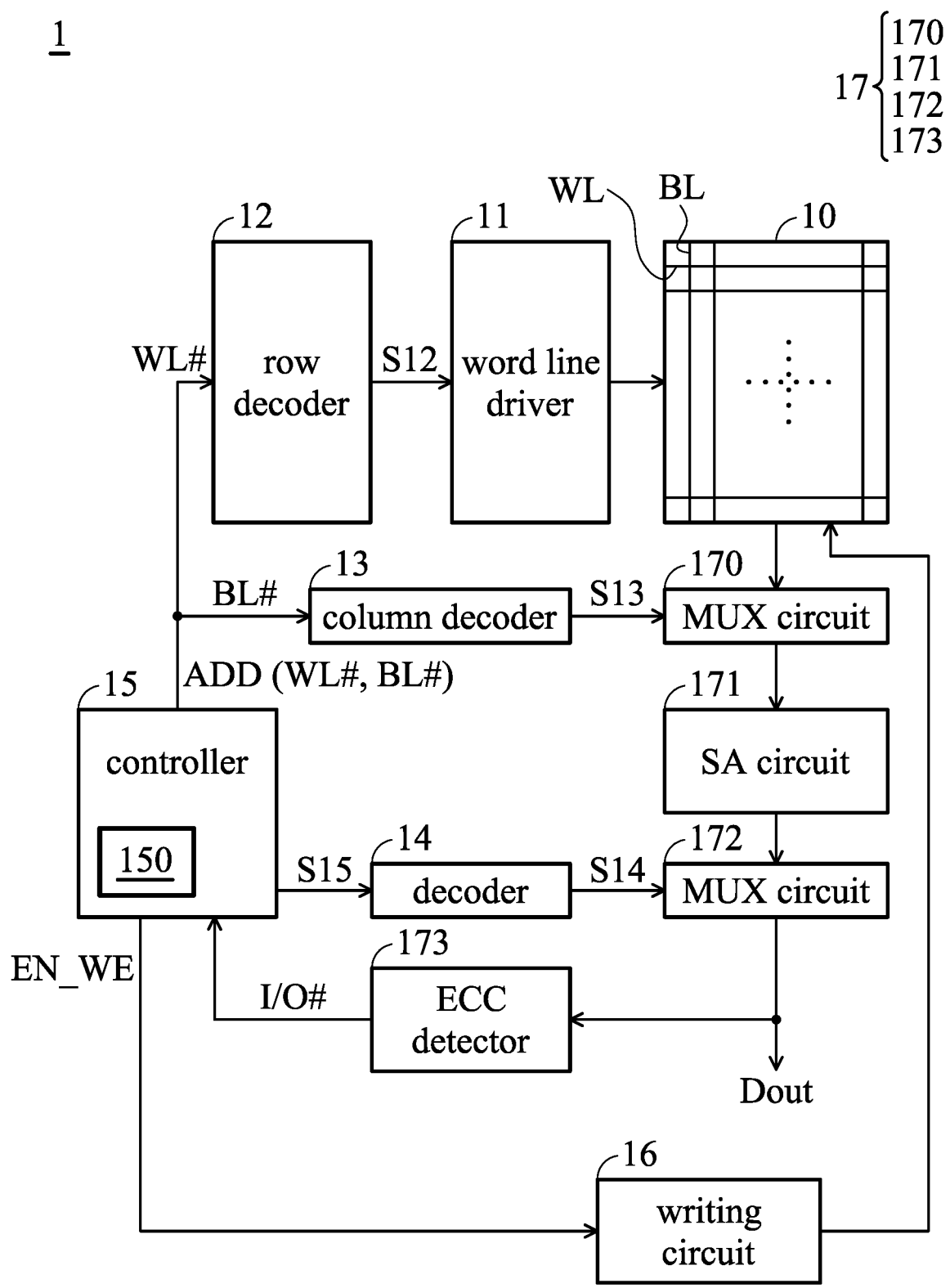
FIG. 1 shows a memory device according to an exemplary embodiment of the present invention.

FIG. 1 shows a memory device according to an exemplary embodiment of the present invention. Referring to FIG. 1, a memory device 1 comprises a memory array 10, a word line driver 11, a row decoder 12, a column decoder 13, a decoder 14, a controller 15, a writing circuit 16, and readout and detection circuit 17. The readout and detection circuit 17 comprises multiplexer (MUX) circuits 170 and 172, a sensing amplifier (SA) circuit 171, and an error correction code (error correction code, ECC) detector 173. The multiplexer circuits 170 and 172 and the sensing amplifier circuit 171 operate to readout data from the memory array 10, and the ECC detector 173 operates to detect erroneous bits in the readout data. The memory array 10 comprises a plurality of word lines WL, a plurality of bit lines BL, and a plurality of memory cells arranged in an array. The word lines WL and the bit lines BL are arranged in an interlaced pattern. Each memory cell is coupled to one word line WL and one bit line BL.

According to an embodiment of the present invention, the memory device 1 may be implemented by a non-volatile memory, such as a multiple time programmable (MTP) memory, a NOR flash memory, a NAND flash memory, a resistive random access memory (RRAM), a magnetoresistive random access memory (MRAM), or a phase-change memory.

Figure 2:
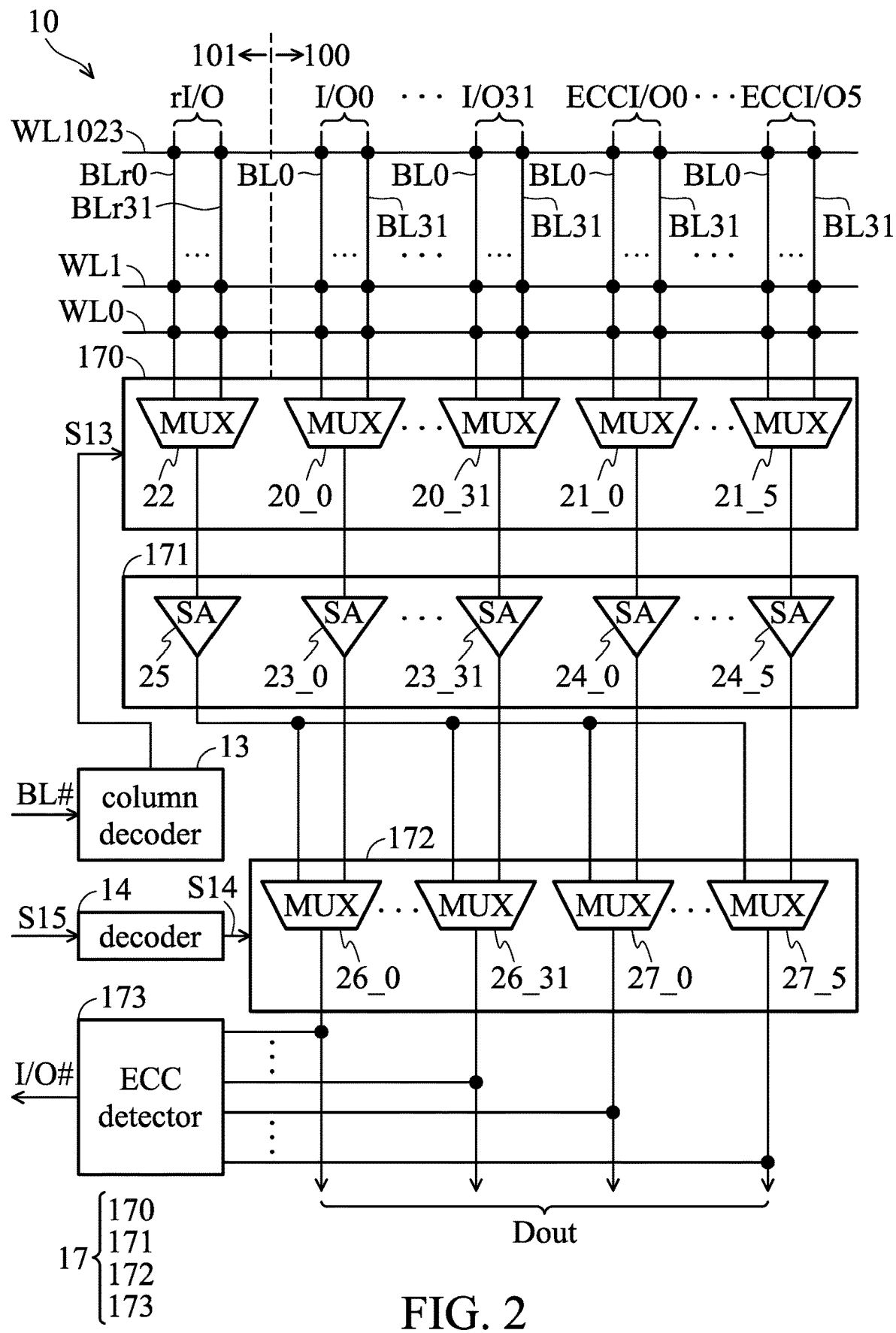
FIG. 2 is a detailed schematic diagram showing a memory array and a readout and detection circuit of a memory device according to an exemplary embodiment of the present invention.

FIG. 2 is a detailed schematic diagram showing the memory array 10 and the readout and detection circuit 17 of the memory device 1 according to an exemplary embodiment of the present invention. Referring to FIG. 2, in the embodiment, 1024 word lines WL0-WL1023 are taken as an example for illustration. The memory array 10 is divided into two sub-arrays: a memory cell array 100 and a repairing memory cell array 101. The bit lines of the memory cell array 100 are divided into a plurality of input/output groups. In the embodiment, the bit lines of the memory cell array 100 are divided into 38 input/output groups, comprising 32 input/output groups I/O0-I/O31 and 6 input/output groups ECCI/O0-ECCI/O5. Among the 38 I/O groups of the memory cell array 100, the number of bit lines of one input/output group is equal to the number of bit lines in each of the other input/output group. According to the embodiment, each input/output group of the memory cell array 100 comprises 32 bit lines BL0-BL31. The memory cells corresponding to the input/output group I/O0-I/O31 are used to store general data, and the memory cells corresponding to the input/output group ECCI/O0-ECCI/O5 are used to store ECC bits for ECC detection.

The bit lines of the repairing memory cell array 101 form an input/output group WO. In the embodiment, the number of bit lines in the input/output group rI/O is equal to the number of bit lines in each input/output group of the memory cell array 100. In details, the input/output group rI/O comprises 32 bit lines BLr0-BLr31. Therefore, the number of input/output groups for the bit lines of the memory array 10 is equal to 39 (39=32+6+1). The memory cells in the repairing memory cell array 101 are referred to as repairing memory cells.

During a reading cycle, the controller 15 generates an address signal ADD# and an enable signal S15. The address signal ADD comprises a word line address WL# and a bit line address BL#. The row decoder 12 receives the word line address WL# and decodes the word line address WL# to generate a driving signal S12. The word driver 11 receives the driving signal S12 and drives one of the word lines WL0-WL1023 each time according to the driving signal S12.

Referring to FIG. 1 and FIG. 2, during a reading cycle of the memory device 1, the column decoder 13 receives the bit line address BL# and decodes the bit line address BL# to generate a selection signal S13. The multiplexer circuit 170 is coupled to all the word lines. In the embodiment, the multiplexer circuit 170 receives the selection signal S13 and selects the bit line, which corresponds to the bit line address BL#, of each input-output group according to the selection signal S13. As shown in FIG. 2, for example, when the bit line address BL# indicates the first bit line in each input-output group, the multiplexer circuit 170 selects the bit line BL0/BLr0 in each input/output group according to the selection signal S13.

Referring to FIG. 2, the multiplexer circuit 170 comprises a plurality of multiplexers (MUX) that correspond to the respective input/output groups for the bit lines. Therefore, the number of multiplexers is equal to the number of input/output groups of the memory array 10, that is, the number of multiplexers is equal to 39. As shown in FIG. 2, the multiplexer circuit 170 comprises multiplexers 20_0-20_31, 21_0-21_5, and 22. The multiplexers 20_0-20_31 correspond to the input/output groups I/O0-I/O31 of the memory cell array 100 respectively, and each of the multiplexers 20_0-20_31 is coupled to the bit lines BL0-BL31 in the corresponding input/output group. The multiplexers 21_0-21_5 correspond to the input/output groups ECCI/O0-ECCI/O5 of the memory cell array 100 respectively, and each of the multiplexers 21_0-21_5 is coupled to the bit lines BL0-BL31 of the corresponding input/output group. The multiplexer 22 corresponds to the input/output group rI/O of the repairing memory cell array 101 and is coupled to all bit lines BLr0-BLr31 in the input/output group WO. Each multiplexer selects one of the 32 bit lines that are coupled to the multiplexer according to the selection signal S13 and transmits the signal that is received from the selected bit line to its output terminal as a readout signal.

The sensing amplifier circuit 171 is coupled to the multiplexer circuit 170 and receives the readout signals from the multiplexer circuit 170. The sensing amplifier circuit 171 amplifies the received readout signals and transmits the amplified readout signals to the multiplexer circuit 172. The sensing amplifier circuit 171 comprises a plurality of sensing amplifiers (SA) that correspond to the respective multiplexers of the multiplexer circuit 170. Therefore, the number of sensing amplifiers of the sensing amplifier circuit 171 is also equal to the number of input/output groups of the memory array 10, that is, the number of sensing amplifiers of the sensing amplifier circuit 171 is equal to 39. Referring to FIG. 2, the sensing amplifier circuit 171 comprises sensing amplifiers 23_0-23_31, 24_0-24_5, and 25. The sensing amplifiers 23_0-23_31, 24_0-24_5, and 25 receive the readout signals from the multiplexers 20_0-20_31, 21_0-21_5, and 22 respectively and amplify the received readout signals.

The decoder 14 receives the enable signal S15 from the controller 15 and decodes the enable signal S15 to generate a selection signal S14.

The multiplexer circuit 172 comprises a plurality of multiplexers (MUX) that correspond to the respective sensing amplifiers 23_0-23_31 and 24_0-24_5. Therefore, the number of multiplexers of the multiplexer circuit 172 is equal to 38 (38=32+6). As shown in FIG. 2, the multiplexer circuit 172 comprises multiplexers 26_0-26_31 and 27_0-27_5. The respective first input terminals of the multiplexers 26_0-26_31 and 27_0-27_5 are coupled to the output terminals of the sensing amplifiers 23_0-23_31 and 24_0-24_5 respectively to receive the readout signals that have been amplified by the sensing amplifiers 23_0-23_31 and 24_0-24_5. The respective second input terminals of the multiplexers 26_0⁻26_31 and 27_0⁻27_5 are coupled to the output terminal of the sensing amplifier 25 to receive the readout signal that has been amplified by the sensing amplifier 25. Each multiplexer selects the amplified readout signal received by the first input terminal or the amplified readout signal received by the second input terminal according to the selection signal S14 from the decoder 14 and then transmits the selected amplified readout signal to its output terminal. The readout signal that is output by the output terminal of one of the multiplexers 26_0-26_31 and 27_0-27_5 serves as one bit, and multiple bits output from the multiplexers 26_0-26_31 and 27_0-27_5 are combined to form readout data Dout.

During a reading cycle of the memory device 1, the ECC detector 173 receives the readout data Dout and performs an ECC detection operation to determine whether there is an erroneous bit in the readout data Dout. When the ECC detector 173 determines that there is an erroneous bit in the readout data Dout, the ECC detector 173 transmits the address information I/O# of the input/output group corresponding to the erroneous bit to the controller 15. At this time, the controller 15 temporarily stores the address information I/O#, the word line address WL#, and the bit line address BL# corresponding to the erroneous bit in a register 150. In response to receiving the address information I/O#, the controller 15 performs a self-repair operation.

In the following paragraphs, the control method for the memory device 1 will be described in detail. Through the control method, the memory device 1 can perform an error detection operation and a self-repair operation.

Figure 3:
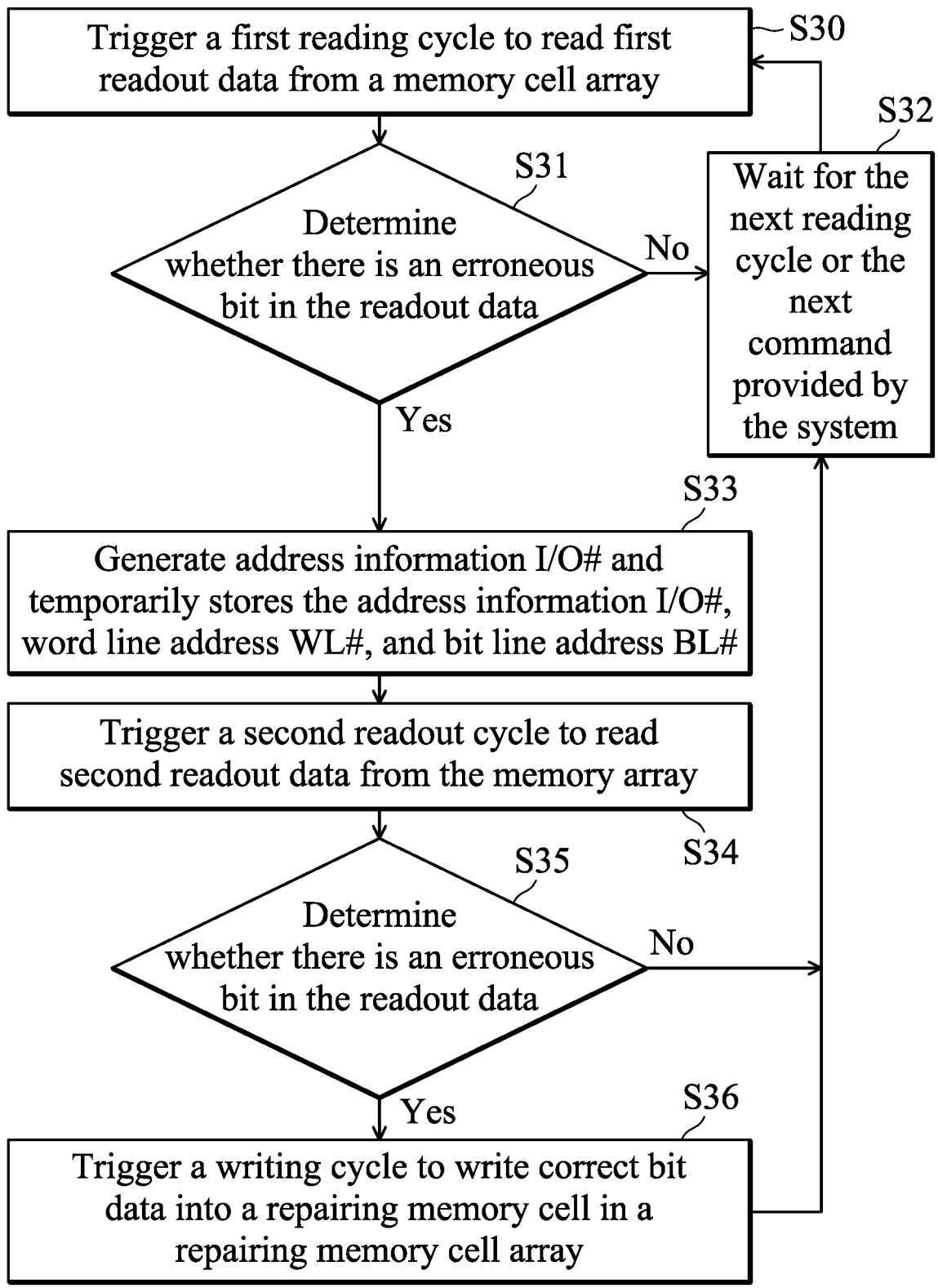
FIG. 3 is a flowchart showing a control method for a memory device according to an exemplary embodiment of the present invention.

FIG. 3 is a flowchart showing a control method for a memory device according to an exemplary embodiment of the present invention.

Referring to FIG. 2 and FIG. 3, in Step S30, the controller 15 triggers a first reading cycle of the memory device 1. During the first reading cycle, the memory device 1 reads the first readout data from the corresponding memory cells in the memory cell array 100 of the memory array 10 according to the word line address WL# and the bit line address BL# to serve as the readout data Dout. The data read from a memory cell is transmitted to the corresponding bit line to serve as a corresponding readout signal.

The operations of the multiplexer circuit 170 and the sensing amplifier circuit 171 during the first reading period are as described above, and the related description is omitted here. It should be noted that during the first reading period, each of the multiplexers 26_0-26_31 and 27_0-27_5 selects the amplified signal at the first input terminal to its output terminal according to the selection signal S14, that is, the multiplexer 26_0-26_31 and 27_0-27_5 select the readout signals from the memory cell array 100 to serve as the readout data Dout. According to the above description, data read from one memory cell (that is, the readout signal on the corresponding bit line) serves as one bit of the readout data Dout.

Next, in Step S31, the ECC detector 173 receives the readout data Dout and performs the ECC detection operation to determine whether there is an erroneous bit in the readout data Dout.

When the ECC detector 173 determines that there is no erroneous bit in the readout data Dout (Step S31-No), the method proceeds to Step S32 to wait for the next reading cycle or the next command provided by the system. When the memory device 1 is assigned to operate the next reading cycle, the method returns to Step S30. At this time, the aforementioned next reading cycle serves as the first reading cycle.

When the ECC detector 173 determines that one bit (first bit) in the readout data Dout is an erroneous bit (Step S31-Yes) (that is, the erroneous first bit is detected), then Step S33 is performed. In Step S33, the ECC detector 173 generates the address information I/O# of the input/output group corresponding to the first bit, and the controller 15 temporarily stores the address information I/O#, the word line address WL#, and the bit line address BL# that correspond to the first bit.

Figure 4:
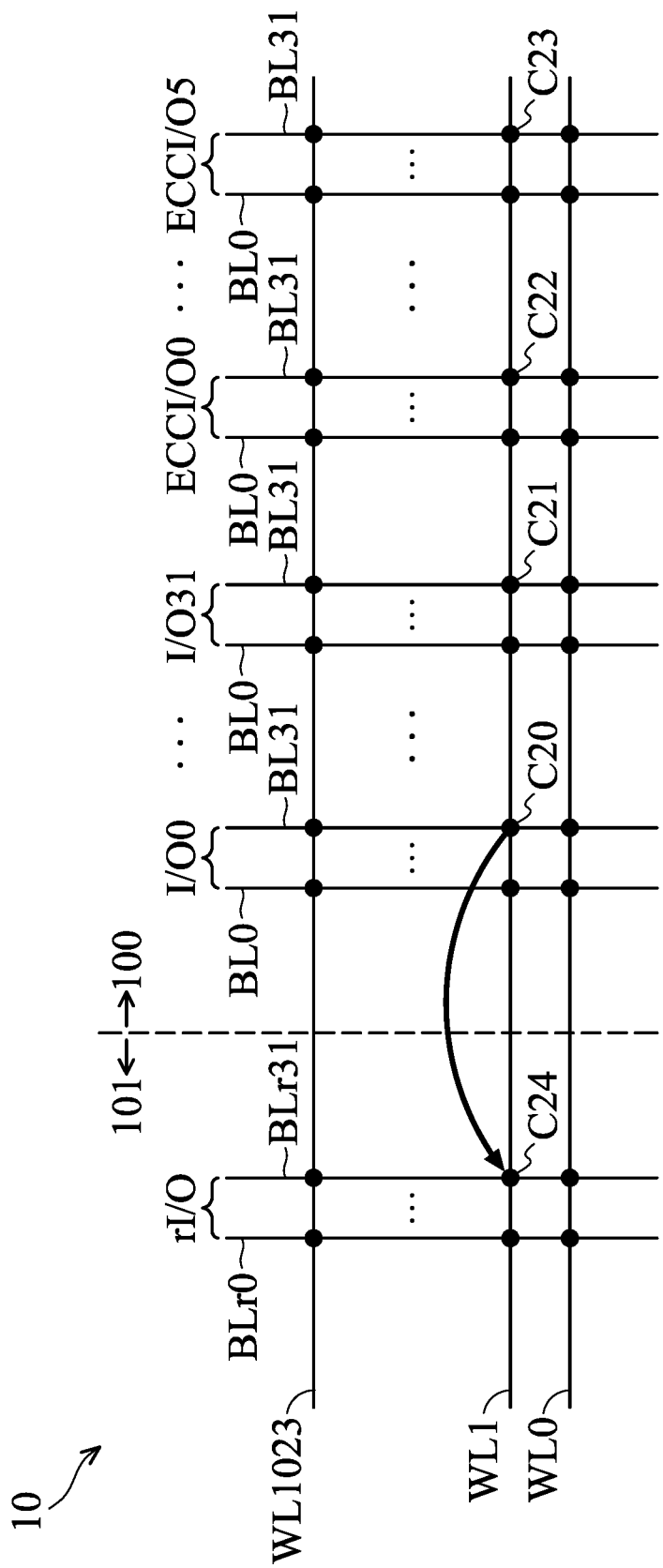
FIG. 4 is a schematic diagram showing self-repair of a memory device according to one exemplary embodiment of the present invention.

Referring to FIG. 4, for example, during the first reading cycle, when word line address WL# indicates the word line WL1 and the bit line address BL# indicates the thirty-second bit line BL31/BLr31, the readout signals that are generated according to the data read from the memory cells (for example, the memory cells C20-C23) coupled to the word line WL and the respective bit lines in the input/output groups I/O0-I/O31 and ECCI/O0-ECCI/O5 are processed by the amplification operation of the sensing amplifier circuit 171 and the selection operation of the multiplexer circuit 172, and then the first readout data is generated as the readout data Dout.

For example, the ECC detector 173 determines that one bit (first bit) in the readout data Dout is an erroneous bit, and the first bit is read from the memory cell C20. In this case, the ECC detector 173 generates the address information I/O# of the I/O group I/O0 corresponding to the memory cell C20 and transmits it to the controller 15. The controller 15 temporarily stores the address information I/O# (indicating the input/output group I/O0), the word line address WL# (indicating the word line WL1), and the bit line address BL# (indicating the bit line BL31) of the memory cell C20.

Then, the method proceeds to Step S34, in response to receiving the address information I/O#, the controller 15 triggers a second readout cycle, and the memory device 1 reads the second readout data from the corresponding memory cells in the memory array 10 according to the word line address WL# and the bit line address BL# to serve as the readout data Dout. It should be noted that the above-mentioned addresses (comprising the word line address WL# and the bit line address BL#) of the second reading cycle is the addresses of the erroneous first bit.

During the second reading cycle, the operations of the multiplexer circuit 170 and the sensing amplifier circuit 171 are as described above, and the related description is omitted here. It should be noted that during the second reading cycle, each of the multiplexers 26_0-26_31 and 27_0-27_5 selects the amplified signal at the first input terminal to its output terminal according to the selection signal S14, that is, the multiplexer 26_0-26_31 and 27_0-27_5 select the readout signals from the memory cell array 100 as the readout data Dout.

In one embodiment, the second reading cycle may be hidden in a writing cycle following the first reading cycle. In another embodiment, if no writing cycle is triggered after the first reading cycle, the second reading cycle is triggered before the system power of the memory device 1 is turned off.

Next, in Step S35, the ECC detector 173 receives the readout data Dout and performs the ECC detection operation to determine whether there is an erroneous bit in the readout data Dout.

When the ECC detector 173 determines that there is no erroneous bit in the readout data Dout (Step S35-No), the method proceeds to Step S32 to wait for the next reading cycle or the next command provided by the system.

When the ECC detector 173 determines that one bit (second bit) in the readout data Dout is an erroneous bit (Step S35-Yes) (that is, the erroneous second bit is detected), the ECC detector 173 generates the address information I/O# of the input/output group corresponding to the second bit, and the controller 15 temporarily stores the address information I/O#, the word line address WL#, and the bit line address BL# that correspond to the second bit.

Next, the controller 15 determines whether the first bit and the second bit come from the same memory cell. In the embodiment, the controller 15 determines whether the first bit and the second bit come from the same memory cell by determining whether the address information I/O#, the word line address WL#, and the bit line address BL# (first position information) corresponding to the first bit are the same as the address information I/O#, the word line address WL#, and the bit line address BL# (second position information) corresponding to the second bit, respectively.

According to the above example, the controller 15 determines whether the first bit and the second bit are from the memory cells C20. When the controller 15 determines that the second bit is from the memory cell C20 as the first bit, the memory device 1 waits for the next reading cycle or the next command provided by the system (that is, Step S32). When the controller 15 determines that both the first bit and the second bit are from the memory cell C20, the memory cell C20 is regarded as a real defective memory cell. Then, the method proceeds to Step S36. In addition, when the controller 15 determines the real defective memory cell C20, the controller 15 stores the address information I/O#, the word line address WL#, and the bit line address BL# of the memory cell C20.

In Step S36, the controller 15 triggers a writing cycle and enables the writing circuit 16 through a write enabling signal EN_WE to write correct bit data into a repairing memory cell in the repairing memory cell array 101 for self-repairing. In the embodiment shown in FIG. 4, the memory cell in the repaired memory cell array 101 in which the correct bit data is written is the repaired memory cell C24. According to the above description, the defective memory cell C20 is coupled to the word line WL1 and the thirty-second bit line BL31 in the input/output group I/O0. According to the embodiment of FIG. 4, the repairing memory cell C24 in which the correct bit data is written is also coupled to the word line WL1 and the thirty-second bit line BLr31 in the input/output group WO. In other words, the memory cell C20 and the repairing memory cell C24 are coupled to the same word line WL1.

After Step S36, the method proceeds to Step S32 to wait for the next reading cycle or the next command provided by the system.

According to the above, when it is determined that there is an erroneous bit in the readout data Dout during a reading cycle, the controller 15 first temporarily stores the position information (comprising I/O#, WL#, and BL#) of the memory cell C20 corresponding to the erroneous bit and trigger a reading cycle again. During the re-triggered reading cycle, if it is determined that the bit from the same memory cell C20 is still an erroneous bit, then the memory cell C20 is deemed to be a real defective memory cell. After determining the defective memory cell C20, a repairing memory cell C24 in the repairing memory cell array 101 is written with correct bit data so that the repairing memory cell C24 replaces the memory cell C20. In other words, the repairing memory cell C24 is used for repairing the memory cell C20. Therefore, the memory device 1 and the control method of the memory device 1 provided by the present invention can prevent an incorrect determination of erroneous bits and accomplish self-repair by writing the correct bit data to a repairing memory cell.

In the subsequent reading cycles, once the defective memory cell C20 is to be read according to the word line address WL# and the bit line address BL#, the controller 15 controls the multiplexer circuit 172s through the bit line address BL to select the readout signal corresponding to the repairing memory cell C24 to replace the readout signal corresponding to the memory cell C20. Thus, the repairing memory cell C24 replaces the memory cell C20.

Referring to FIG. 2 and FIG. 4, the multiplexer 26_0 of the multiplexer circuit 172 selects the amplified readout signal at the second input terminal according to the selection signal S14 and transmits the selected the amplified readout signal to its output terminal, while each of the other multiplexers 26_1-26_31 and 27_0-27_5 still selects the amplified readout signal at the first input terminal according to the selection signal S14 and transmits the selected the amplified readout signal to its output terminal. Through the selection operation of the multiplexer 26_0, the repairing memory cell C24 replaces the memory cell C20.

Figure 5:
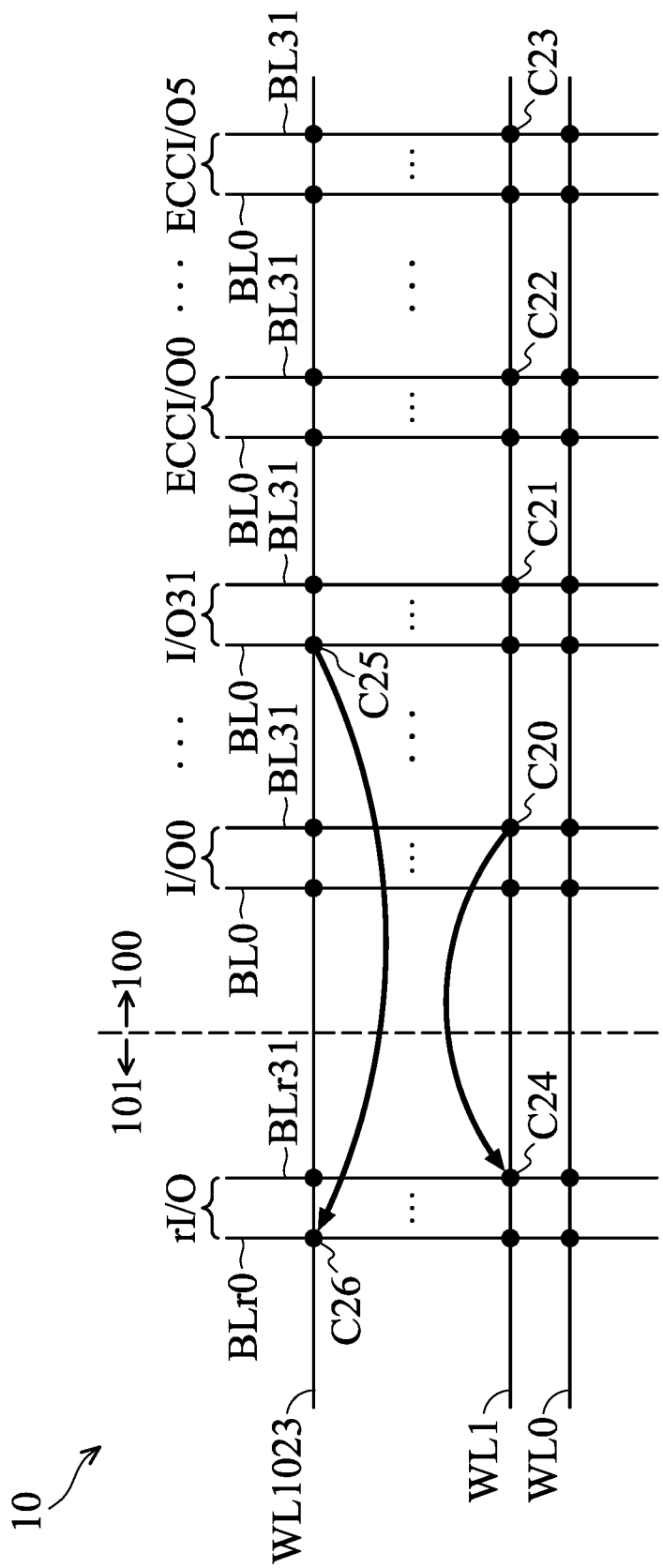
FIG. 5 is a schematic diagram showing self-repair of a memory device according to another exemplary embodiment of the present invention.

In other embodiments, after the process shown in FIG. 3 is repeatedly performed, two or more real defective memory cells, which do not occur in the same read cycle, can be determined successively. Referring to FIG. 5, the memory cells C20 and C25 are deemed to be real defective memory cells. In this case, the repairing memory cell C24 replaces the memory cell C20 as previously described, and the repairing memory cell C26 replaces the memory cell C25. As shown in FIG. 5, the memory cell C25 is coupled to the word line WL1023 and the first bit line BL0 in the input/output group I/O31. Thus, the repairing memory cell C26 replacing the memory cell C25 is also coupled to the word line WL1023 and the first bit line BLr0 in the input/output group WO.

In the above embodiments, the number of bit lines in the input/output group rI/O of the memory cell array 101 and the number of bit lines in each input/output group of the memory cell array 100 both are equal to 32. According to other embodiments, in cases where there are not many erroneous bits, the number of bit lines in the input/output group rI/O may be less than the number of bit lines in each input/output group of the memory cell array 100, which can reduce the area.

Figure 6:
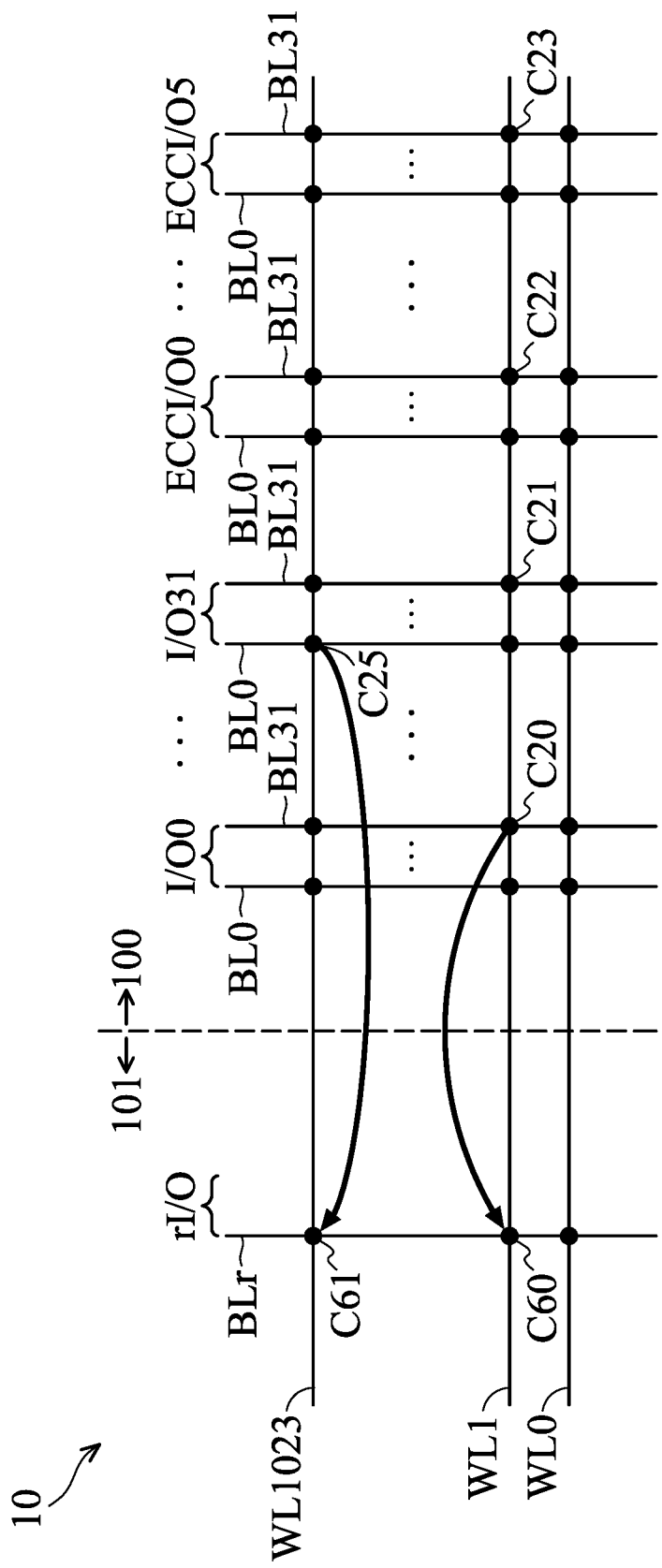
FIG. 6 is a schematic diagram showing self-repair of a memory device according to another exemplary embodiment of the present invention.

Referring to FIG. 6, the input/output group rI/O comprises only one bit line BLr. In this configuration, the multiplexer 22 of the multiplexer circuit 170 can be omitted. The bit line BLr is directly connected to the sensing amplifier 25 of the sensing amplifier circuit 171.

In the embodiment of FIG. 6, when it is determined that the memory cell C20 is a real defective memory cell by performing the method of FIG. 3, the memory cell C20 is replaced with the repairing memory cell C60. As shown in FIG. 6, the memory cell C20 and the repairing memory cell C60 are coupled to the same word line WL1. By performing the method of FIG. 3 repeatedly, when it is determined that a memory cell that is not coupled to the word line WL1 (for example, the memory cell C25) is another real defective memory cell, the memory cell C25 is replaced with the repairing memory cell C61. As shown in FIG. 6, the memory cell C25 and the repairing memory cell C61 are coupled to the same word line WL1023.

According to the embodiment in FIG. 6, when two or more real defective memory cells are determined successively, if these real defective memory cells correspond to different word lines, each real defective memory cell (for example, the memory cell C25) can be replaced with a repairing memory cell (for example, the repairing memory cell C61) coupled to the same word line.

Figure 7:
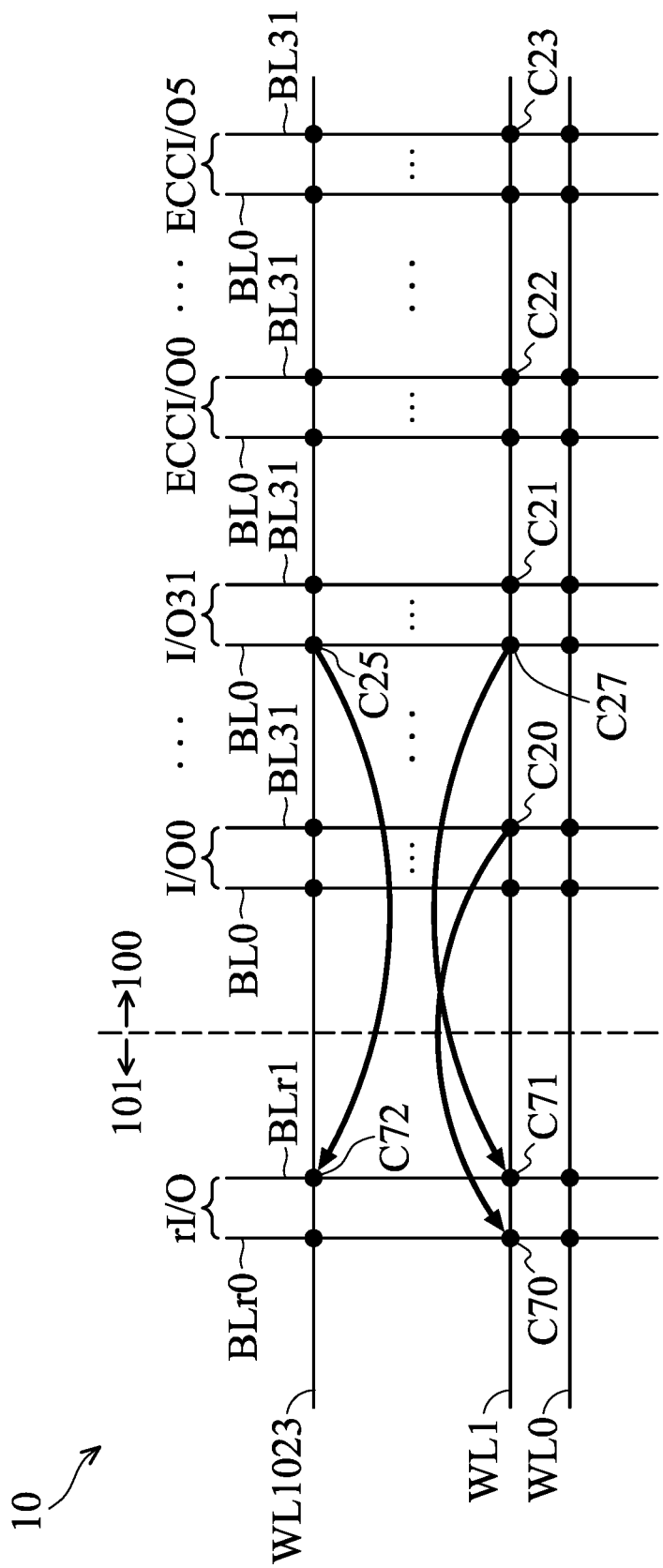
FIG. 7 is a schematic diagram showing self-healing of a memory device according to another embodiment of the present invention.

Referring to FIG. 7, the input/output group rI/O comprises two bit lines BLr0 and BLr1. In this configuration, the multiplexer 22 of the multiplexer circuit 170 is coupled to the bit lines BLr0 and BLr1 and selects the bit line BLr0 or BLr1 according to the selection signal S13. The repairing memory cells coupled to the bit line BLr0 are used to repair some of the memory cells in the memory cell array 100, and the repairing memory cells coupled to the bit line BLr1 are used to repair some of the memory cells in the memory cell array 100. For example, the repairing memory cells coupled to the bit line BLr0 are used to repair the memory cells coupled to the bit lines in the input/output groups I/O0-I/O18, and the repairing memory cells coupled to the bit line BLr1 are used to repair the memory cells coupled to the bit line in the input/output groups I/O19-I/O31 and ECCI/O0-ECCI/O5.

In the embodiment of FIG. 7, when it is determined that the memory cell C20 coupled to the word line WL1 and the bit line BL31 in the input/output group I/O0 is one real defective memory cell by performing the method of FIG. 3, the memory cell C20 is replaced with the repairing the memory cell C70 coupled to the word line WL1 and the bit line BLr0. As shown in FIG. 7, the memory cell C20 and the repairing memory cell C70 are coupled to the same word line WL1.

When it is determined that the memory cell C27 coupled to the word line WL1 and the bit line BL0 in the input/output group I/O31 is another real defective memory cell by performing the method of FIG. 3, the memory cell C27 is replaced with the repairing memory cell C71 coupled to the bit line WL1 and the bit line BLr1. As shown in FIG. 7, the memory cell C27 and the repairing memory cell C71 are coupled to the same word line WL1.

According to the above embodiment, both the memory cells C20 and C27 that are deemed to be real defective memory cells are coupled to the word line WL1. Since the bit line BL31 coupled to the memory cell C20 belongs to the input/output group I/O0 and the bit line BL0 coupled to the memory cell C27 belongs to the input/output group I/O31, repairing memory cells C70 and C71 that are coupled to the same word line WL1 and the different bit lines BLr0 and BLr1 are respectively used to replace the memory cells C20 and C27.

When it is determined that the memory cell C25 coupled to the word line WL1023 and the bit line BL0 in the input/output group I/O31 is another real defective memory cell by performing the method of FIG. 3, the memory cell C25 is replaced with the repairing memory cell C72 coupled to the bit line WL1023 and the bit line BLr1. As shown in FIG. 7, the memory cell C25 and the repairing memory cell C72 are coupled to the same word line WL1.

According to the above, both the memory cells C27 and C25 that are deemed to be real defective memory cells are coupled to the bit line BL0 in the input/output group I/O 31. Since the memory cell C27 is coupled to the word line WL1 and the memory cell C25 is coupled to the word line WL1023, the repairing memory cells C71 and C72 the repairing memory cell C71 that are coupled to the same bit line BLr1 and the different word lines WL1 and WL1023 to respectively replace memory the cells C27 and C25.

According to the above various embodiments, the memory device 1 and the control method for the memory device in the present invention can accurately determine at least one defective memory cell in the memory cell array 100 and replace the at least one defective memory cell with at least one repairing memory cell in the repaired memory cell array 101. Even if multiple memory cells in the memory cell array 100 are deemed to be real defective memory cells, these defective memory cells, which do not occur in the same read cycle, can be repaired through the self-repair operation of the present invention. The embodiments of the present invention are not limited to repairing only one single defective memory cell.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory device comprising:
a plurality of word lines and a plurality of bit lines;
a plurality of memory cells arranged in a memory cell array, wherein each of the plurality of memory cells is coupled to one of the plurality of word lines and one of the plurality of bit lines;
a plurality of repairing memory cells, wherein each of the plurality of repairing memory cells is coupled to one of the plurality of word lines and one of the plurality of bit lines;
a controller operating to enable a first reading cycle; and
a readout and detection circuit operating to read first readout data from the memory cell array during the first reading cycle and detect that a first bit in the first readout data is an erroneous bit,
wherein the controller enables a second reading cycle in response to the detected first bit, and the readout and detection circuit reads second readout data from the memory cell array during the second reading cycle and detects that a second bit in the second readout data is an erroneous bit,
wherein the controller determines whether both the first bit and the second bit correspond to a first memory cell of the plurality of memory cells, and in response to the controller determining that both the first bit and the second bit correspond to the first memory cell, the controller triggers a first writing cycle to write first correct bit data to a first repairing memory cell of the plurality of repairing memory cells, and
wherein the first repairing memory cell and the first memory cell correspond to the same word line.

2. The memory device as claimed in claim 1, wherein:
the controller triggers a third reading cycle, and the readout and detection circuit reads third readout data from the memory cell array during the third reading cycle and detects that a third bit in the third readout data is an erroneous bit,
the controller enables a fourth reading cycle in response to the detected third bit, and the read and detect circuit reads fourth readout data from the memory cell array during the fourth reading cycle and detects that a fourth bit in the fourth readout data is an erroneous bit, and
the controller determines whether both the third bit and the fourth bit both correspond to a second memory cell of the plurality of memory cells, and in response to the controller determining that both the third bit and the fourth bit correspond to the second memory cell, the controller triggers a second writing cycle to write second correct bit data to a second repairing memory cell of the plurality of memory cells.

3. The memory device as claimed in claim 2, wherein:
the first memory cell and the second memory cell correspond to different ones of the plurality of word lines, and
the second repairing memory cell and the second memory cell correspond to the same word line.

4. The memory device as claimed in claim 3, wherein the first repairing memory cell and the second repairing memory cell correspond to different ones of the plurality of bits.

5. The memory device as claimed in claim 3, wherein the first repairing memory cell and the second repairing memory cell correspond to the same bit line.

6. The memory device as claimed in claim 2, wherein:
the first memory cell, the second memory cell, the first repairing memory cell, and the second repairing memory cell correspond to the same word line, and
the first repairing memory cell and the second repairing memory cell correspond to different ones of the plurality of bit lines.

7. The memory device as claimed in claim 1, wherein the second reading cycle is in a writing cycle following the first reading cycle.

8. The memory device as claimed in claim 1, wherein the second reading cycle is triggered before system power of the memory device is turned off.

9. The memory device as claimed in claim 1, wherein:
in response to the readout and detection circuit detecting that the first bit in the first readout data is an erroneous bit, the controller temporarily stores first position information of the memory cell corresponding to the first bit,
in response to the readout and detection circuit detecting that the second bit of the second readout data is an erroneous bit, the controller temporarily stores second position information of the memory cell corresponding to the second bit,
the controller determines whether the first location information is the same as the second location information, and
in response to the controller determining that the first location information is the same as the second location information, the controller determines that both the first bit and the second bit correspond to the first memory cell.

10. The memory device as claimed in claim 1, wherein the memory device is a non-volatile memory.

11. A control method for a memory device, wherein the memory device comprises a plurality of word lines, a plurality of bit lines, a plurality of memory cells arranged in a memory cell array, and a plurality of repairing memory cells, and the control method comprises:
triggering a first reading cycle of the memory device to read first readout data from the memory cell array;
determining whether there is an erroneous bit in the first readout data;
in response to determining that a first bit in the first readout data is an erroneous bit, triggering a second reading cycle;
during the second reading cycle, reading second readout data from the memory cell array;
determining whether there is an erroneous bit in the second readout data;
in response to determining that a second bit in the second readout data is an erroneous bit, determining whether both the first bit and the second bit correspond to a first memory cell of the plurality of memory cells; and
in response to determining that both the first bit and the second bit correspond to the first memory cell, triggering a first writing cycle to write first correct bit data to a first repairing memory cell of the plurality of repairing memory cells,
wherein the first repairing memory cell and the first memory cell correspond to the same word line.

12. The control method as claimed in claim 11, further comprising:
triggering a third reading cycle of the memory device to read third readout data from the memory cell array;
determining whether there is an erroneous bit in the third readout data;
in response to determining that a third bit in the third readout data is an erroneous bit, triggering a fourth reading cycle;
during the fourth reading cycle, reading fourth readout data from the memory cell array;
determining whether there is an erroneous bit in the fourth readout data;
in response to determining that a fourth bit in the fourth readout data is an erroneous bit, determining whether both the third bit and the fourth bit correspond to a second memory cell of the plurality of repairing memory cells; and
in response to determining that both the first three bits and the fourth bits correspond to the second memory cell, triggering a second writing cycle to write second correct bit data to a second repairing memory cell of the plurality of repairing memory cells,
wherein the second repairing memory cell and the second memory cell correspond to the same word line.

13. The control method as claimed in claim 12, wherein:
the first memory cell and the second memory cell correspond to different ones of the plurality of word lines, and
the second repairing memory cell and the second memory cell correspond to the same word line.

14. The control method as claimed in claim 12, wherein the first repairing memory cell and the second repairing memory cell correspond to the different ones of the plurality of bit lines.

15. The control method as claimed in claim 12, wherein the first repairing memory cell and the second repairing memory cell correspond to the same bit line.

16. The control method as claimed in claim 12, wherein:
the first memory cell, the second memory cell, the first repairing memory cell, and the second repairing memory cell correspond to the same word line, and
the first repairing memory cell and the second repairing memory cell correspond to different ones of the plurality of bit lines.

17. The control method as claimed in claim 11, wherein the second reading cycle is in a writing cycle following the first reading cycle.

18. The control method as claimed in claim 11, wherein the second reading cycle is triggered before system power of the memory device is turned off.

* * * * *